(12) United States Patent
So et al.

(10) Patent No.: US 8,149,760 B2
(45) Date of Patent: Apr. 3, 2012

(54) METHOD AND MOBILE SYSTEM FOR PATH MANAGEMENT IN MULTI-HOP CELLULAR NETWORK AND DATA FRAME USED FOR THE METHOD AND THE MOBILE SYSTEM

(75) Inventors: Jung Min So, Suwon-si (KR); Ki-Sun Oh, Gunpo-si (KR); Mi-Sun Do, Suwon-si (KR); Hee Jung Byun, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 762 days.

(21) Appl. No.: 12/186,781

(22) Filed: Aug. 6, 2008

(65) Prior Publication Data

US 2009/0181693 A1 Jul. 16, 2009

(30) Foreign Application Priority Data

Jan. 14, 2008 (KR) ........................ 10-2008-0004139

(51) Int. Cl.
*H04B 7/14* (2006.01)
(52) U.S. Cl. ........................................ 370/315; 370/229
(58) Field of Classification Search .......... 370/229–236, 370/252, 253, 226, 243, 246, 315, 492, 331; 455/503, 13.1, 11.1
See application file for complete search history.

(56) References Cited

U.S. PATENT DOCUMENTS

| 7,218,891 | B2 | 5/2007 | Periyalwar et al. | |
|---|---|---|---|---|
| 2006/0199530 | A1* | 9/2006 | Kawasaki | .................. 455/7 |
| 2007/0066241 | A1 | 3/2007 | Hart | |
| 2009/0135729 | A1* | 5/2009 | Saffre | .................. 370/252 |

FOREIGN PATENT DOCUMENTS

| JP | 2005-33557 | 2/2005 |
|---|---|---|
| JP | 2005-143046 | 6/2005 |
| KR | 2006-132422 | 12/2006 |
| KR | 2007-1417 | 1/2007 |
| KR | 2007-30622 | 3/2007 |
| KR | 2007-49017 | 5/2007 |
| KR | 2007-50270 | 5/2007 |
| KR | 2007-80265 | 8/2007 |

* cited by examiner

*Primary Examiner* — Ricky Ngo
(74) *Attorney, Agent, or Firm* — NSIP Law (57) ABSTRACT

A mobile system, a mobile system, a method for managing a path in a multi-hop cellular network, and a data frame used in the mobile system. The mobile system includes: an information receiving unit to receive information about at least one of link quality, traffic load, and frequency channel size, via a network; and a path establishment unit to establish a path to a base station based on the received information.

23 Claims, 10 Drawing Sheets

| HOP COUNT | TRAFFIC LOAD (DL) | LINK QUALITY INFORMATION (DL) | TRAFFIC LOAD (UL) | LINK QUALITY INFORMATION (UL) | |
|---|---|---|---|---|---|
| 1 | 50 | 1 | 50 | 1 | ~702 |
| 0 | 50 | 4 | 50 | 4 | ~701 |

| HOP COUNT | TRAFFIC LOAD (DL) | LINK QUALITY INFORMATION (DL) | TRAFFIC LOAD (UL) | LINK QUALITY INFORMATION (UL) | |
|---|---|---|---|---|---|
| 1 | 50 | 2 | 50 | 2 | ~802 |
| 0 | 50 | 2 | 50 | 2 | ~801 |

| HOP COUNT | FREQUENCY CHANNEL SIZE INFORMATION (DL) | TRAFFIC LOAD (DL) | LINK QUALITY INFORMATION (DL) | FREQUENCY CHANNEL SIZE INFORMATION (UL) | TRAFFIC LOAD (UL) | LINK QUALITY INFORMATION (UL) |
|---|---|---|---|---|---|---|
| 1 | 5 | 50 | 1 | 5 | 50 | 1 |
| 0 | 10 | 50 | 4 | 10 | 50 | 4 |

902
901

METHOD AND MOBILE SYSTEM FOR PATH MANAGEMENT IN MULTI-HOP CELLULAR NETWORK AND DATA FRAME USED FOR THE METHOD AND THE MOBILE SYSTEM

CROSS-REFERENCE TO RELATED APPLICATION

This application claims the benefit of Korean Patent Application No. 2008-4139, filed in the Korean Intellectual Property Office on Jan. 14, 2008, the disclosure of which is incorporated herein by reference.

BACKGROUND OF THE INVENTION

1. Field of the Invention

Aspects of the present invention relate to a mobile system, a method of managing a path in a multi-hop cellular network, and a data frame used in the mobile system.

2. Description of the Related Art

In a multi-hop cellular network, data can be transmitted via at least one relay station when data is transmitted from a base station to a terminal. A multi-hop system can expand a service area using relays that are inexpensive to establish and maintain, and also can decrease a number of base stations that are expensive to establish and maintain.

In a single-hop system, a predetermined terminal must pass a base station and a network entry process to connect to a network. The terminal scans for base stations adjacent to the terminal. When there are a plurality of base stations, the terminal registers itself in a base station having the strongest signal strength from the base stations. Similar to a multi-hop cellular network, a terminal scans for a base station or a relay station existing adjacent to the terminal, and connects to a base station or a relay station having the strongest signal strength. If a terminal is connected to a relay station, the terminal can be connected to a base station that serves the relay station via the relay station. Generally, in an existing system, once a terminal establishes a path to a base station, the terminal transmits/receives data with the base station via the path until a specific change occurs, such as a transfer of the terminal to a different location. To receive data, a terminal requests bandwidth from a base station via the path, and is allocated resources via the path.

Except when a terminal is first powered on and performs a network entry process, a terminal having received a service from one cell moves to another cell via a handover process. In the latter case, in the existing method, it is usual to select a base station or a relay station having the highest signal quality associated with a signal strength of an access link from among target base stations or relay stations.

SUMMARY OF THE INVENTION

Aspects of the present invention provide a mobile system and a method to establish a path that can decrease a service admission rate and increase an acceptance rate and performance without additional resources by considering all paths to a base station as well as all paths to an access link.

Aspects of the present invention also provide a mobile system and a method to establish a path that can balance efficiency and evenness of an entire mobile system by transmitting new control information to the mobile system and changing a parameter according to a system administrator's policy. Aspects of the present invention also provide a data frame that is used for transmitting new control information to a mobile system.

According to an aspect of the present invention, a mobile system is provided. The mobile system includes: an information receiving unit to receive information about at least one of link quality, traffic load, and frequency channel size, via a network; and a path establishment unit to establish a path to a base station or at least one relay station, based on the received information.

According to another aspect of the present invention, the link quality information includes information about a coding scheme of a link.

According to another aspect of the present invention, the traffic load information includes information about a data transmission amount per second to transmit from any one of the base station and the at least one relay station.

According to another aspect of the present invention, the path establishment unit includes: an increasing resource usage rate calculation unit to calculate increasing resource usage rates of each of the base station and the at least one relay station based on the received information; and a selection unit to select one of the base station and the at least one relay station to establish the path based on the increasing resource usage rates.

According to an aspect of the present invention, a method to establish a path is provided. The method includes: receiving information about at least one of link quality, traffic load, and frequency channel size, via a network; and establishing a path to a base station based on the received at least one information.

According to another aspect of the present invention, a data frame is provided. The data frame includes: a link quality information storage region to store link quality information; and a traffic load information storage region to store a traffic load information, and wherein any one of a base station and at least one relay station is determined where a mobile system is connected to based on the link quality information and the traffic load information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to present embodiments of the present invention, examples of which are illustrated in the accompanying drawings, wherein like reference numerals refer to the like elements throughout. The embodiments are described below in order to explain the present invention by referring to the figures.

Figure 1:
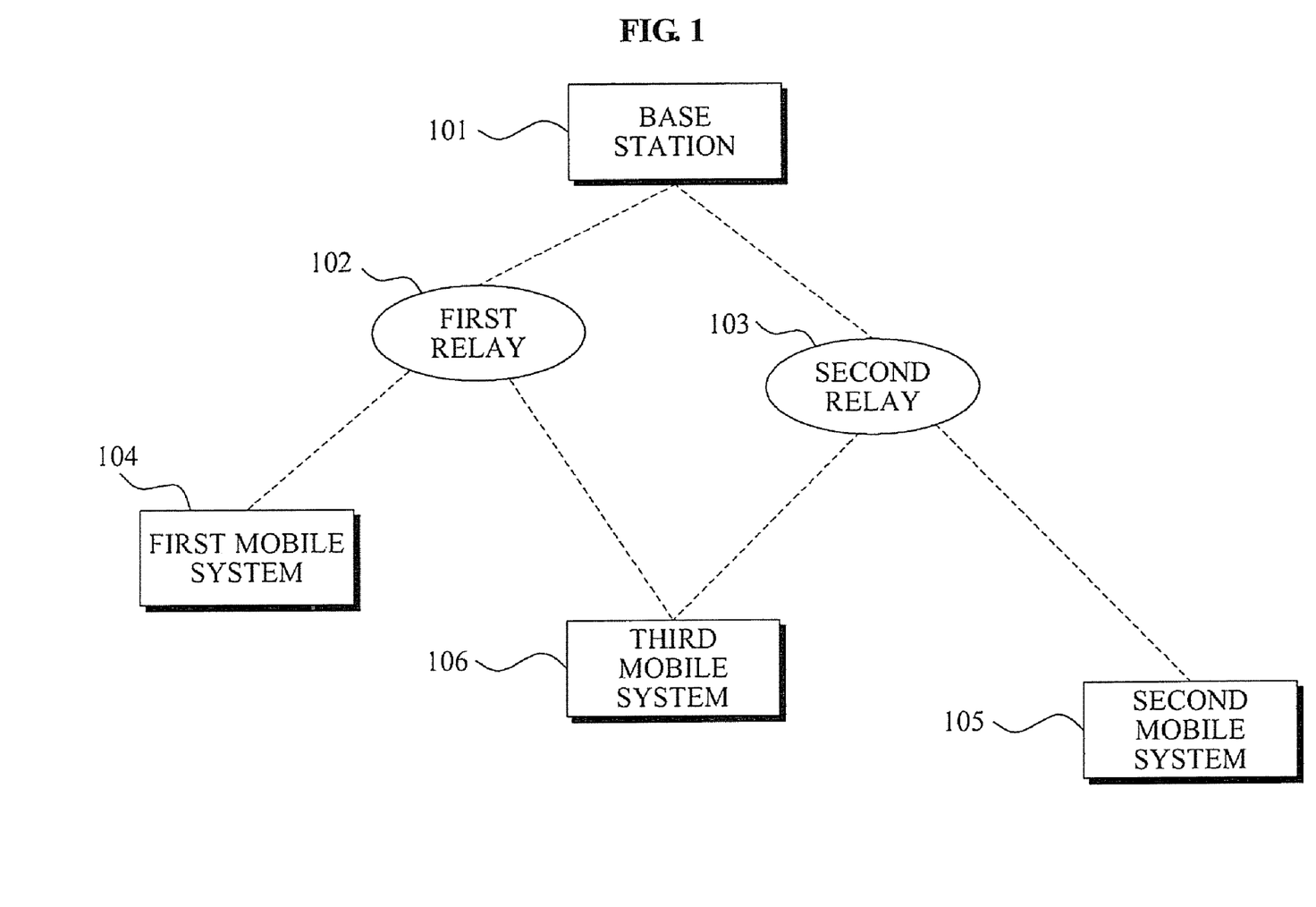
FIG. 1 is a schematic diagram illustrating a multi-hop cellular network according to an embodiment of the present invention.

FIG. 1 shows a multi-hop cellular network according to an embodiment of the present invention. As shown in FIG. 1, in a present cell, a first relay station 102 and a second relay station 103 are respectively connected to a base station 101, a first mobile system 104 is connected to the first relay station 102, and a second mobile system 105 is connected to the second relay station 103. In a conventional scheme, a second mobile system 105 selects a relay station having a better signal quality of an access link from among the first relay station 102 and the second relay station 103 when a third mobile system 106 moves from another cell to the present cell to establish a path to the base station 101. However, according to an embodiment of the present invention, it is possible to use a better path to improve performance of an entire system or the third mobile system 106 to receive a service. A third mobile system 106 can establish the path based on the received at least one information of link quality information, traffic load information, and frequency channel size information.

Figure 2:
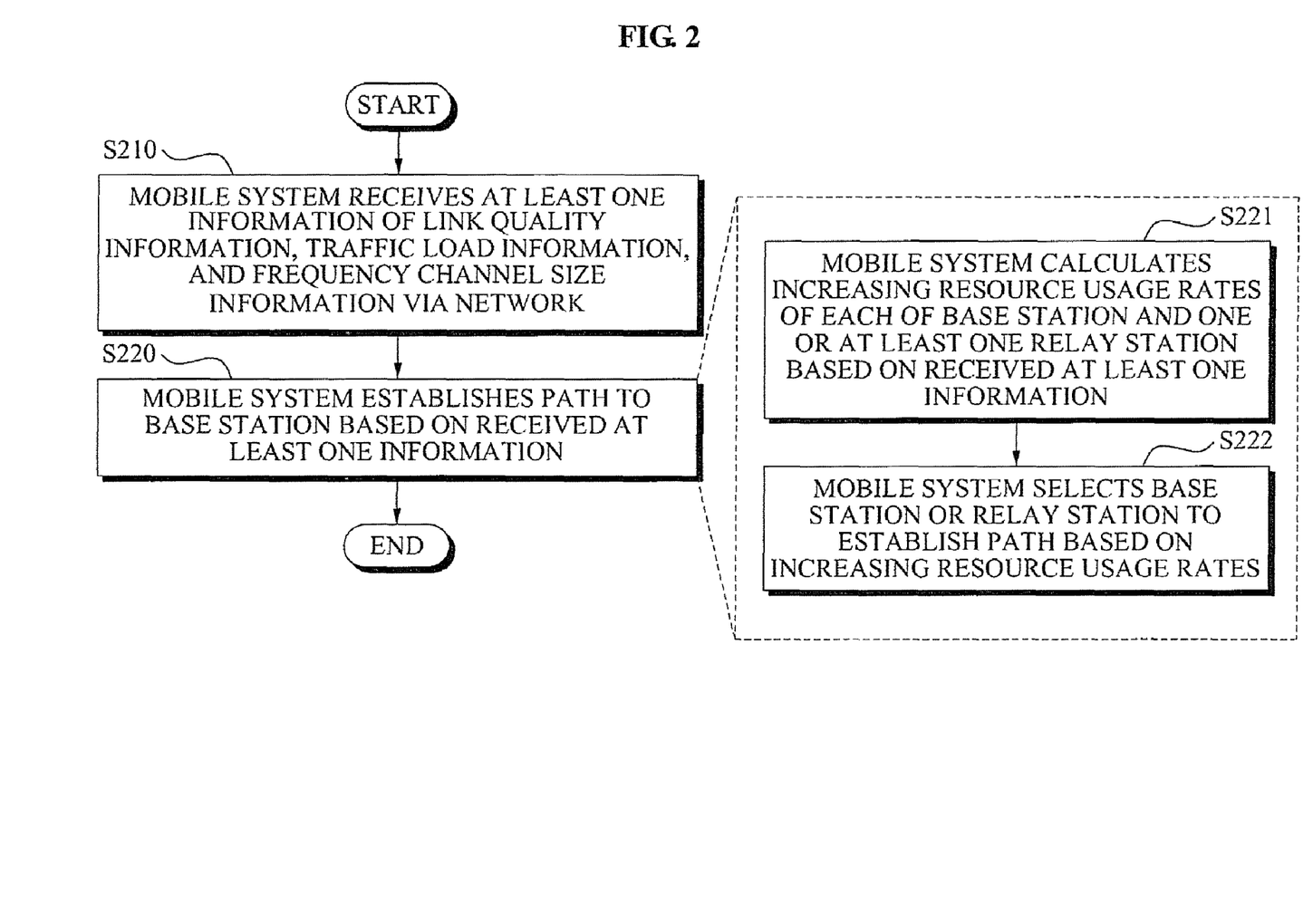
FIG. 2 is a flowchart of a process of establishing a path according to an embodiment of the present invention.

FIG. 2 is a flowchart of a process of establishing a path according to an embodiment of the present invention. In operation S210, a mobile system that tries to establish a path receives information on at least one of link quality, traffic load, and frequency channel size, via a network. The link quality information can include information about a coding scheme of a link. The traffic load information can include information about a data transmission amount per second to transmit from any one of the base station and the at least one relay station. The mobile system may utilize all of the above information or may use some, but not all, of the above information to establish the path.

For example, a base station and relay stations transmit data to a frequency channel of a specific size. The frequency channel used in the base station and the relay stations can be identical or different. The frequency channel size is referred to herein as 'F'. The base station and the relay stations determine the coding scheme according to a distance to a destination node and a channel condition when transmitting the data. Examples of the coding scheme include Quadrature Phase Shift Keying (QPSK), 64-Quadrature Amplitude Modulation (QAM), and the like. Each coding scheme has spectrum efficiency for a corresponding coding scheme, and the spectrum efficiency can be referred to as '$e_{scheme}$'.

A data transmission amount that the base stations or the relay stations can transmit during a predetermined time can be in proportion to multiplication of the frequency channel size 'F' and the spectrum efficiency '$e_{scheme}$'. For example, if the base station uses a frequency channel of 10 MHz and the spectrum efficiency '$e_{scheme}$' use a coding scheme of 2 b/s/Hz, the base station can transmit the data by a transmission speed of 20 Mbps when all overhead is disregarded. The data is transmitted by a transmission speed 10 Mbps when spectrum efficiency '$e_{scheme}$' of the coding scheme is 1 b/s/Hz. As described above, as a base station and a relay station use a coding scheme with a higher spectrum efficiency '$e_{scheme}$', it is possible to transmit more data during the same time. Spectrum efficiency and a traffic load should be considered when a mobile system establishes a path to receive a service from a base station.

In operation S220, the mobile system establishes a path to a base station based on the received information. The process may include operation S221 and operation S222 to establish a path to a base station based on the received at least one information as shown in FIG. 2.

In operation S221, the mobile system calculates increasing resource usage rates of each of the base station and at least one relay station based on the received at least one information. The increasing resource usage rate can include an estimated value of an increasing resource usage rate in the base station or in the relay station when the mobile system is connected to either the base station or the relay station. The mobile system can calculate a first rate for the link quality information of the traffic load information, and calculate a second rate for the frequency channel size information of the first rate as the increasing resource usage rate. For example, an increasing resource usage rate occurring in an entire system due to a mobile system being added can be calculated as below:

$$m = \frac{1}{F} \times \sum_{i=1}^{k} \frac{L_i}{e_i} \quad \text{[Equation 1]}$$

where 'm' indicates an increasing resource usage rate occurring in an entire system due to a mobile system being added, '$L_i$' indicates a traffic load of an $i^{th}$ flow, and '$e_i$' indicates a spectrum efficiency of a coding scheme used in the $i^{th}$ flow respectively.

In operation S222, the mobile system selects a base station or a relay station to establish the path based on the increasing resource usage rates. The mobile system can select either the base station or the relay station via various methods based on the increasing resource usage rate. For example, the mobile system can select either the base station or the relay station so that a sum of increasing resource usage rates for each of the base station and the relay station on the path is at a minimum, or can select either the base station or the relay station based on existing resource usage rates and the increasing resource usage rates of the base station and the relay station so that an increasing resource usage rate of the base station or the relay station having a highest existing resource usage rate is at a minimum. The mobile system can also select either the base station or the relay station so that a resource usage rate of the base station is at a minimum, or give a weighted value to each increasing resource usage rate of each of the base station and the relay station on the path according to a hop count, and can select either the base station or the relay station so that a sum of increasing resource usage rates with the weighted value being given is at a minimum.

The resource usage rate of the base station and the relay station can be changed depending on which paths the mobile system is being added to, and the mobile system can establish the path based on the resource usage rate. A standard of selecting the path can be determined by a system administrator or a prescribed policy.

Figure 3:
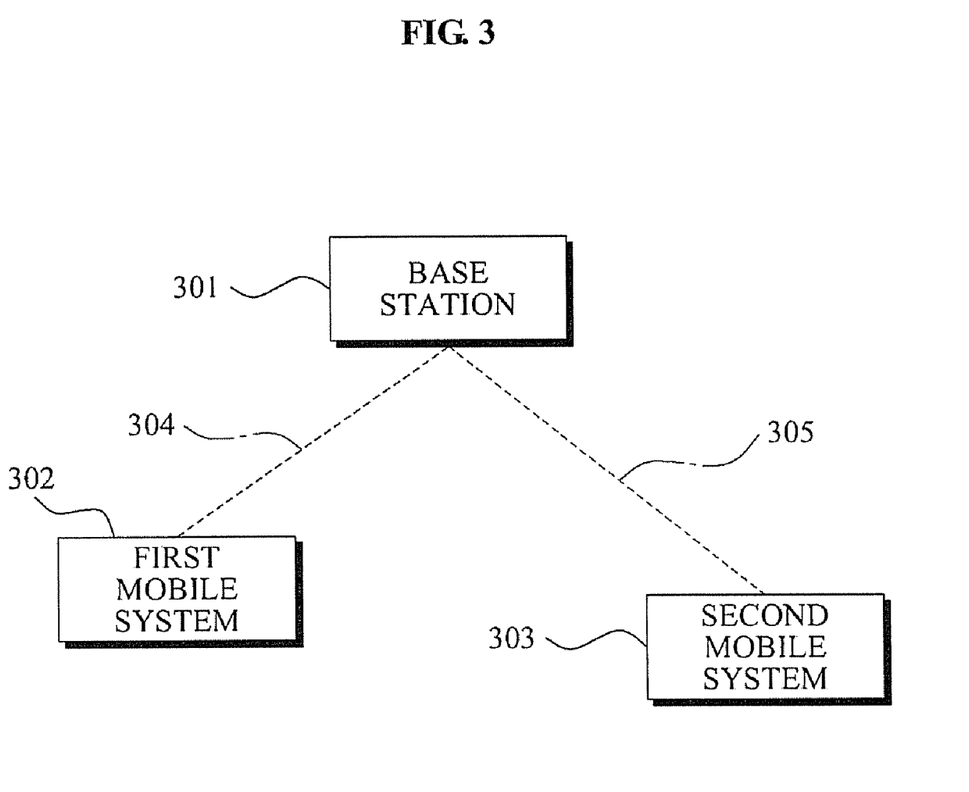
FIG. 3 is a diagram illustrating a process of calculating an increasing resource usage rate according to an embodiment of the present invention.

FIG. 3 shows a process of calculating an increasing resource usage rate according to an embodiment of the present invention. A base station 301 transmits data to a first mobile system 302 and a second mobile system 303. For example, a frequency channel size 'F' may use 10 MHz in all nodes of a network. When the base station 301 transmits 5 Mbps data using a coding scheme whose spectrum efficiency '$e_{scheme}$' is 2 b/s/Hz to the first mobile system 302, and when the base station 301 transmits 5 Mbps data using a coding scheme whose spectrum efficiency '$e_{scheme}$' is 1 b/s/Hz to the second mobile system 303, the base station 301 uses 25% (1/10 MHz*5 Mbps/2 b/s/Hz=0.25) of resources for the first mobile system 302, and uses 50% (1/10 MHz*5 Mbps/1 b/s/Hz=0.5) of resources for the second mobile system 303. Therefore, the base station 301 uses 75% of resources for the first mobile system 302 and the second mobile system 303.

Figure 4:
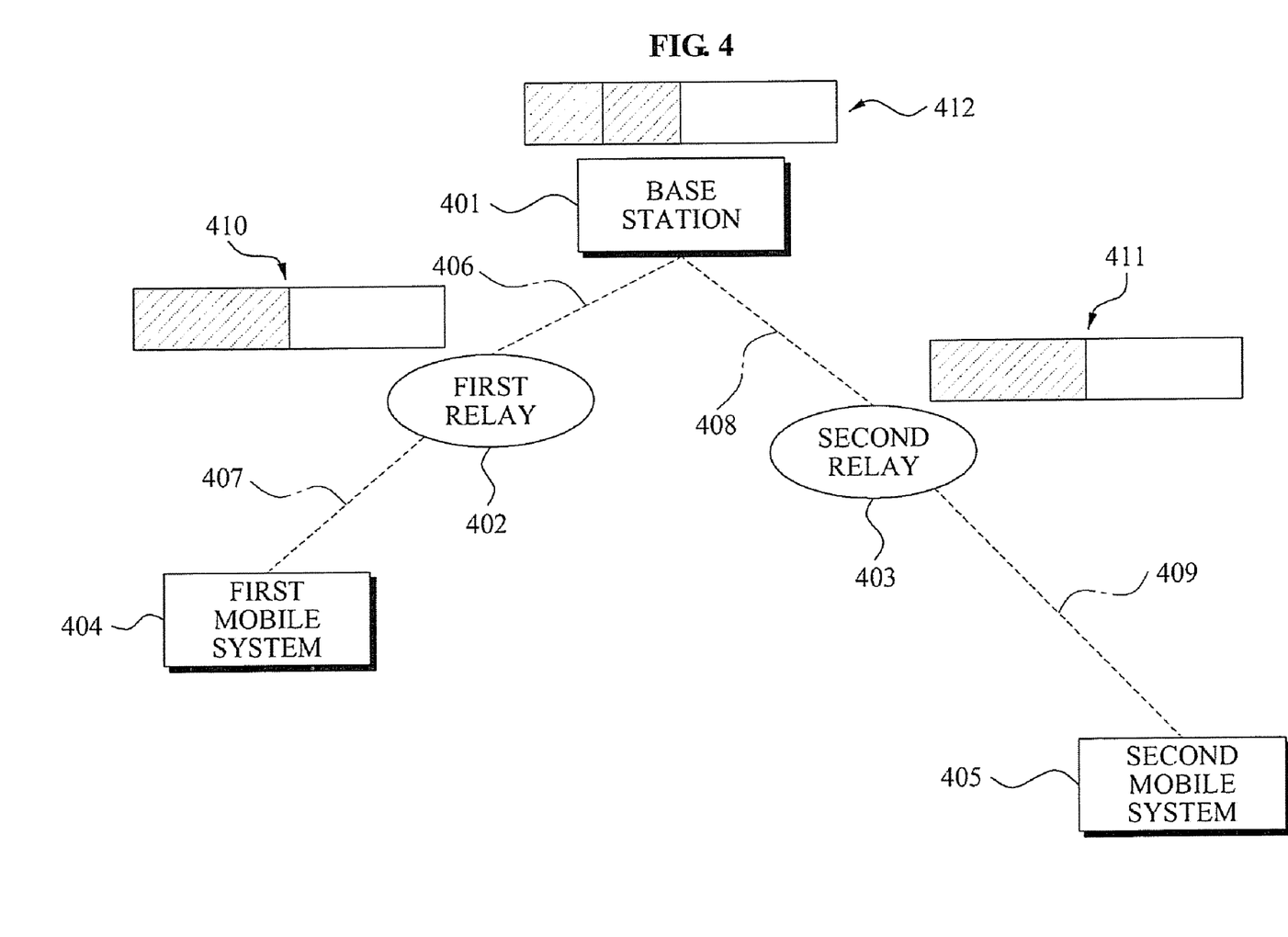
FIG. 4 is a diagram illustrating a resource usage rate in a base station and a relay station according to an embodiment of the present invention.

FIG. 4 shows a resource usage rate in a base station and a relay station according to an embodiment of the present invention. As shown in FIG. 4, a base station 401 is connected to a first relay station 402 and a second relay station 403, a first mobile system 404 is connected to the first relay station 402, and the second mobile system 404 is connected to the second relay station 403. As with the example of FIG. 3, a frequency channel size 'F' of 10 MHz is used in all of the nodes. In addition, a coding scheme having 4 b/s/Hz of spectrum efficiency is used in a first link 406, a coding scheme having 2 b/s/Hz of spectrum efficiency is used in a second link 407, a coding scheme having 2 b/s/Hz of spectrum efficiency is used in a third link 408, and a coding scheme having 1 b/s/Hz of spectrum efficiency is used in a fourth link 409.

When the base station 401 transmits 10 Mbps data to the mobile system 404 and transmits 5 Mbps data to the second mobile system 405, a resource usage rate 410 of the first relay station 402 is 50% (1/10 MHz×10 Mbps/2 b/s/Hz=0.5), a resource usage rate 411 of the second relay station 403 is 50% (1/10 MHz×5 Mbps/1 b/s/Hz=0.5). A resource usage rate 412 of a base station 401 is 50% (1/10 MHz×10 Mbps/4 b/s/Hz+1/10 MHz×5 Mbps/2 b/s/Hz=0.5). When a new mobile system moves from another cell to a present cell, resource usage rates of a base station 401, the first relay station 402, and the second relay station 403 change differently according to a path which the new mobile system will be connected.

Figure 5:
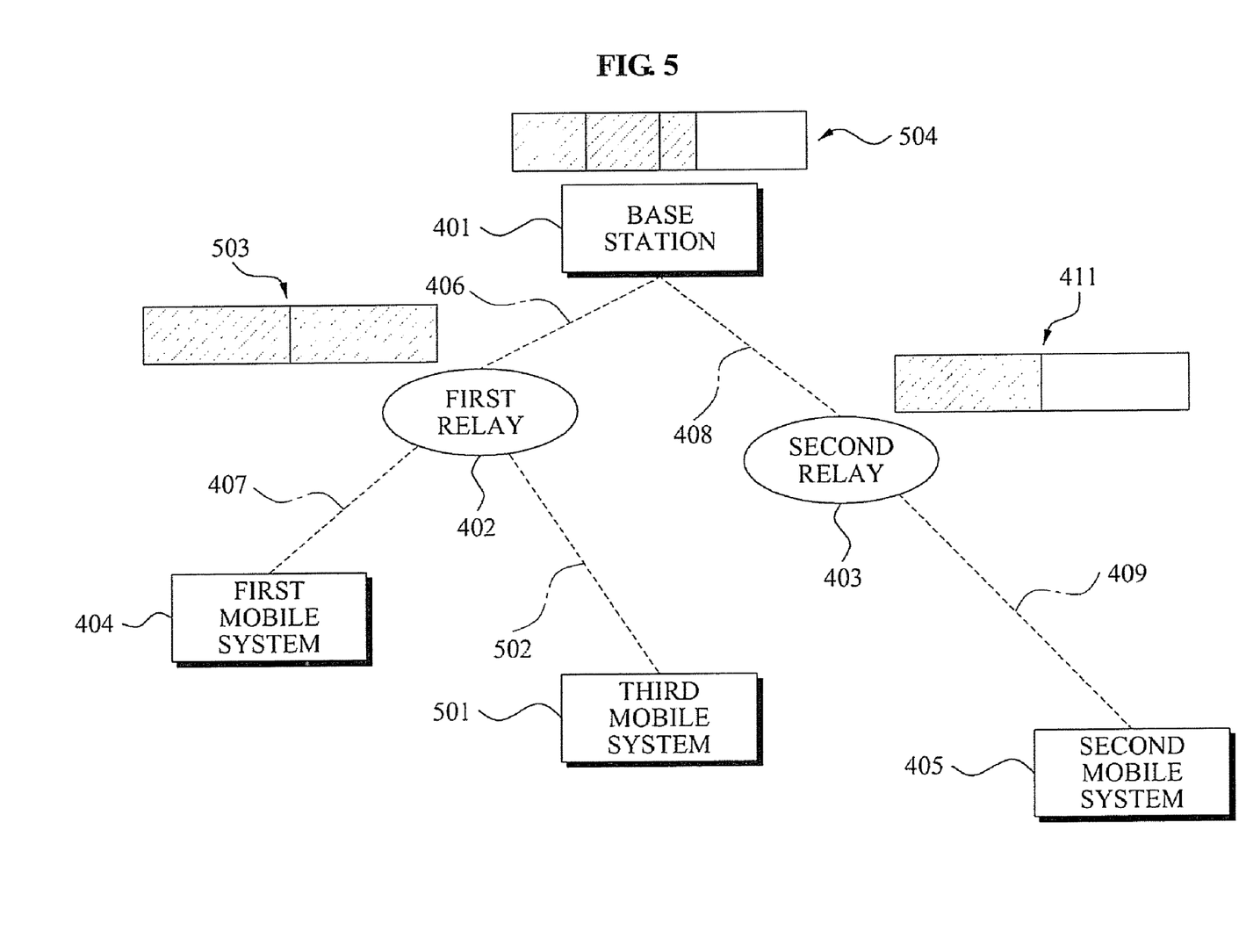
FIG. 5 is a diagram illustrating a change of a resource usage rate depending on mobile systems being added according to an embodiment of the present invention.

FIG. 5 shows a change of a resource usage rate depending on mobile systems being added according to an embodiment of the present invention. Under the condition shown in FIG. 4, FIG. 5 shows a change of a resource usage rate when a third mobile system 501 moves to a present cell to select the first relay station 402 of FIG. 4. In this example, a coding scheme having spectrum efficiency of 1 b/s/Hz is used in a link 502 established between the first relay station 402 of FIG. 4 and the third mobile system 501, and the third mobile system 501 receives data at 5 Mbps from a base 401 of FIG. 4. Since an increasing resource usage rate of the first relay station 402 linked to the third mobile system 501 is 50% (1/10 MHz×5 Mbps/1 b/s/Hz=0.5) together with a existing resource usage rate 50%, resource usage rates 503 becomes 100%. In addition, since an increasing resource usage rate of a base station 401 is 12.5% (1/10 MHz*5 Mbps/4 b/s/Hz=0.125) together with the existing resource usage rate 50%, a resource usage rate 504 is 62.5%.

Figure 6:
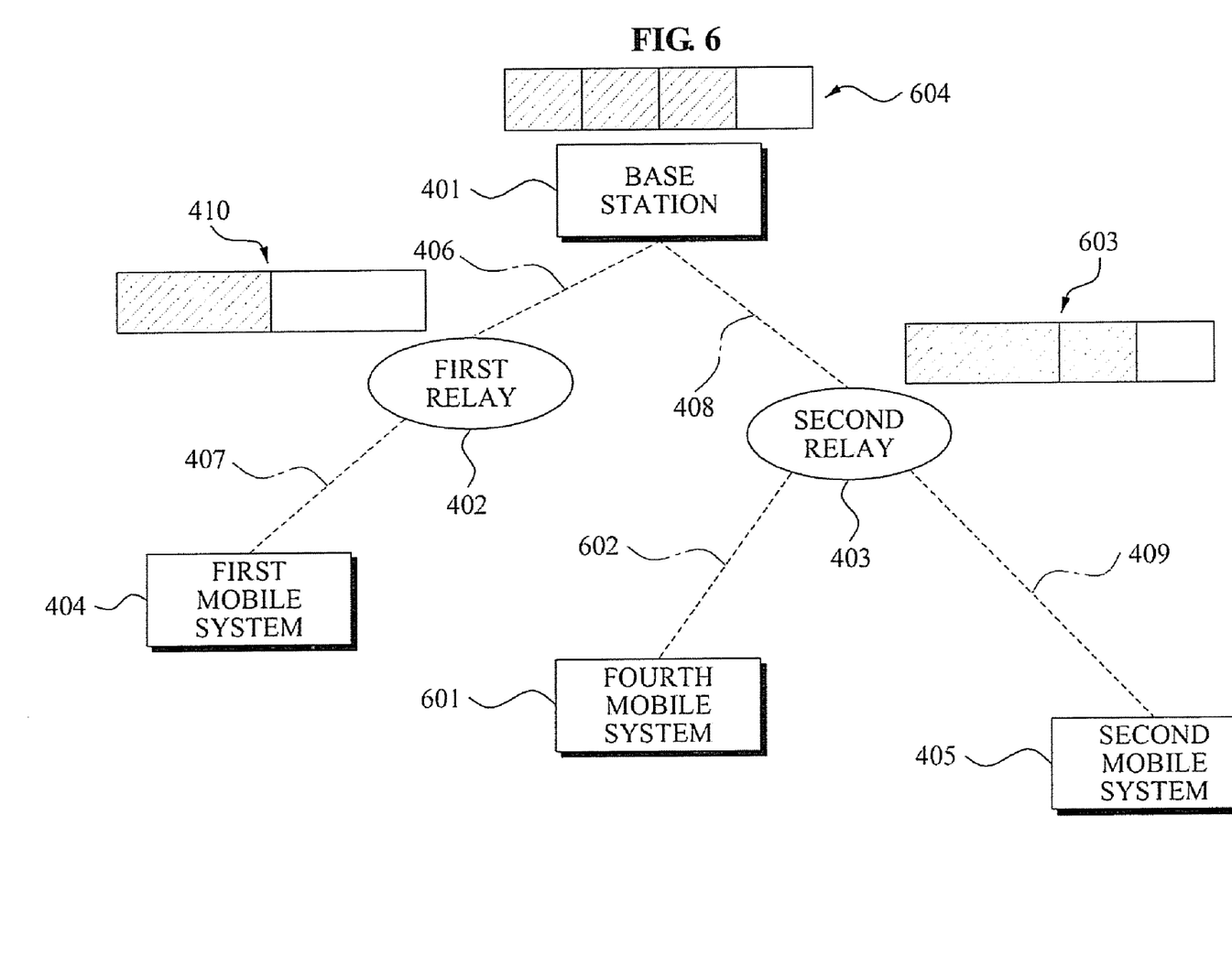
FIG. 6 is a diagram illustrating a change of a resource usage rate depending on a mobile system being added according to an embodiment of the present invention.

FIG. 6 shows a change of a resource usage rate depending on a mobile systems being added according to an embodiment of the present invention. Under the condition shown in FIG. 4, FIG. 6 shows a change of a resource usage rate when a third mobile system 601 when a new mobile system moves to a present cell to select the second relay station 403. When a coding scheme having spectrum efficiency of 2 b/s/Hz is used in a link 602 established between the second relay station 403 and the third mobile system 601, the third mobile system 601 receives 5 Mbps data from a base 401 as shown in FIG. 5. If an increasing resource usage rate of the second relay station 403 linked to the third mobile system 601 is 25% (1/10 MHz×5 Mbps/2 b/s/Hz=0.25) together with the existing resource usage rate 50%, then the resource usage rate is 75%. In addition, since an increasing resource usage rate of a base station 401 is 25% (1/10 MHz×5 Mbps/2 b/s/Hz=0.25) together with the existing resource usage rates 50%, a resource usage rate is 75%.

As shown in FIGS. 5 and 6, when a new mobile system selects a single path of connectable paths to receive a service from a base station, states of resources of the base station and the relay stations are changed as a result of the selection. The new mobile system may select a path depending on a system policy. Four example standards of selecting the path will be described below.

First, the new mobile system can select either the base station or the relay station so that a sum of increasing resource usage rates to each of the base station and the relay station on the path is at a minimum. A sum of increasing resource usage rates can be minimized by adding a new service. For example, as shown in FIG. 5, when the third mobile system 501 receives a service via the first relay station 402, a sum of increasing resource usage rates is 62.5% (50% in the first relay station 402, and 12.5% in the base station 401). Under the condition shown in FIG. 6, when the third mobile system 601 receives a service via the second relay station 403, a sum of increasing resource usage rates is 50% (25% in the second relay station 403, and 25% in the base station 401). Therefore, the new mobile system can minimize the increasing resource usage rates.

Second, the new mobile system can select either the base station or the relay station based on the existing resource usage rate and the increasing resource usage rate of the base station and the at least one relay station, so that an increasing resource usage rate of a base station or a relay station having the highest existing resource usage rate is at a minimum. When a new service starts, a resource usage rate of a node having a highest resource usage rate can be at a minimum by considering resource usage rates of all base stations and relay stations on paths. For example, as shown in FIG. 5, a resource usage rate of the first relay station 402 becomes 100%, and in FIG. 6, a resource usage rate of the second relay station 403 becomes 75%. Therefore, the new mobile system can be serviced via the second relay station 403. An advantage of this process is that a success rate is high when a new service is started at a predetermined location of a present cell, since resource usage rates of a base station and a relay station are balanced. If the new mobile system is serviced via the first relay station 402, a resource usage rate of the first relay station 402 becomes 100%. Therefore another mobile system cannot be allocated resources, if paths other than via the first relay station 402 do not exist.

Third, the new mobile system can select either the base station or the relay station so that a resource usage rate of the base station is at a minimum. For example, as shown in FIG. 5, a resource usage rate of the base station 401 is 63.5%, and as shown in FIG. 6, a resource usage rate of the base station 401 is 75%. Therefore, the new mobile system can be serviced via the first relay station 402. The resource usage rate of the first relay station 402 then becomes 100% and resources to the mobile system cannot be allocated. However, in view of using resources of the base station 401, the base station 401 can provide a service to more mobile systems which are directly linked to the base station 401. The above described process can be used under condition that providing a service via a base station is preferable to providing a service via a relay station.

Finally, the new mobile system may give a weighted value to each increasing resource usage rate of each of the base station and the relay station on the path according to a hop count, and select either the base station or the relay station so that a sum of increasing resource usage rates with the weighted value is minimized. In the first process, different weighted values are given to each relay station by considering a hop count from a base station, and a resource usage rate is calculated according to the weight value. According to this process, resources of relay stations adjacent to a base station where a heavy bottleneck phenomenon occurs can have higher importance than relay stations far from the base station.

According to a process establishing a path according to aspects of the present invention, it is possible to decrease a service admission rate and to increase an acceptance rate and performance without additional resources by considering all paths to a base station as well as all paths to an access link. For this purpose, a new control information not present in an existing system, should be transmitted to a mobile system. This will be described by referring to an IEEE 802.16 system; however, other aspects of the present invention are not limited to a particular wireless technology, and may employ other wireless technologies that employ base stations and relay stations.

For example, a mobile system being serviced in another cell moves to a present (new) cell. A base station of the new cell is a target base station. The mobile system can be directly connected to the target base station when the mobile system is located at a place where the mobile station can connect to the target base station directly, or may connect to the target base station via a relay station connected to the target station. A serving base station transmits information about a base station or a relay station located adjacent to the mobile system via a message of 'MOB_NBR-ADV'. The mobile system can determine a base station or relay station to handover to when the mobile system receives the information and needs to perform a handover. In the present IEEE 802.16 system, the message of 'MOB_NBR-ADV' includes information about an 'SINR' of a link or a number of hops away from a base station of a relay station. In addition, in the present IEEE 802.16 system, an available radio resource parameter representing a traffic load presently loaded on a base station is transmitted via the message of 'MOB_NBR-ADV'.

To apply a process of establishing a path according to an embodiment of the present invention, a mobile system should obtain additional information that an existing system does not have, specifically, path information. As shown in FIG. 6, when a new mobile system is connected via the second relay station 403, link quality information and traffic load information about a connectable path may be needed to calculate a traffic load of the system. In addition to information about a relay station to be connected, information about all nodes on a path from the relay station to the base station may be needed.

Figure 7:
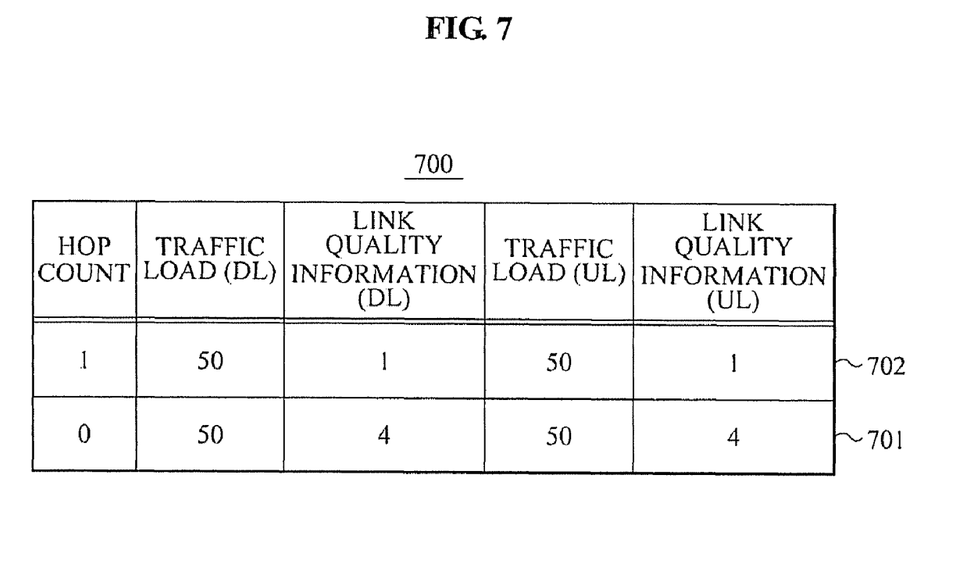
FIG. 7 is a diagram illustrating a table including information from a data frame used in a mobile system according to an embodiment of the present invention.
Figure 8:
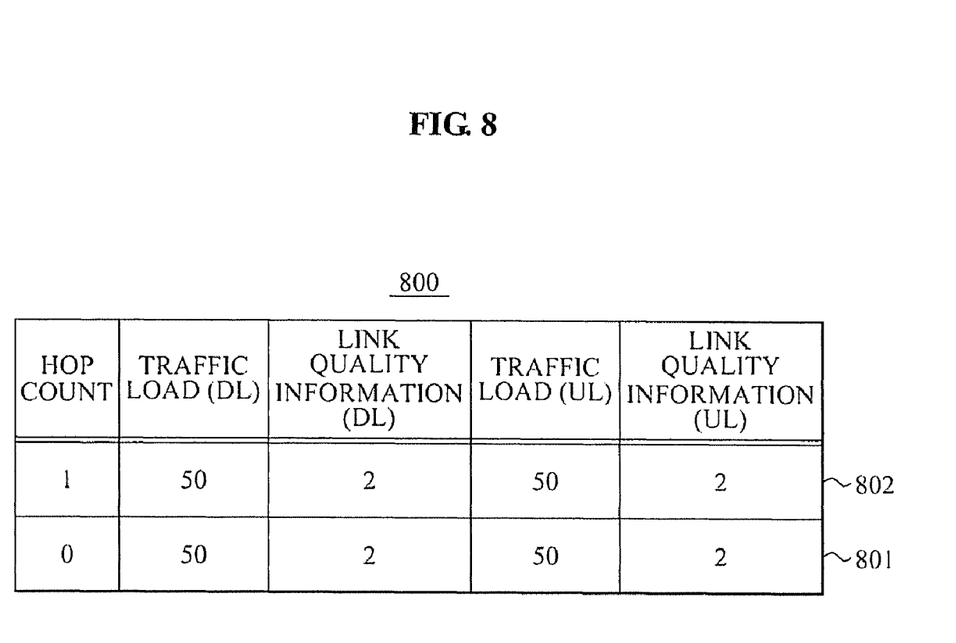
FIG. 8 is a diagram illustrating another example of a table including information from a data frame used in a mobile system according to an embodiment of the present invention.

FIGS. 7 and 8 show tables 700 and 800 including information from data frames used in a mobile system according to an embodiment of the present invention. The table 700 shown in FIG. 7 is an example of information that a new mobile system can receive from the first relay station 402 of FIG. 4. A $3^{rd}$ row 701 shows a traffic load and link quality information for downlinks and uplinks of the base station 401, and a $2^{nd}$ row 702 shows a traffic load and link quality information for downlinks and uplinks of a relay station 402. The table 800 shown in FIG. 8 is an example of information that a new mobile system can receive from the second relay station 403 of FIG. 4. A $3^{rd}$ row 801 shows a traffic load and link quality information for each downlink and uplink of the base station 401 of FIG. 4, and a $2^{nd}$ row 802 shows a traffic load and link quality information for each downlink and uplink of the second relay station 403 of FIG. 4. As described above, a data frame according to an embodiment of the present invention includes link quality information storage area storing link quality information and a traffic load information storage area storing traffic load information, and a base station or a relay station to be linked to the mobile system can be determined based on the link quality information and the traffic load information.

When the mobile system receives information about the base station or the relay station from a serving base station, the serving base station should understand a present resource state of the mobile system and relay stations linked to the mobile system. For this purpose, the relay stations can periodically report a present resource usage amount of a downlink and an uplink of the mobile system to a base station linked to the mobile system, and the base station can record the resource usage amount.

Figure 9:
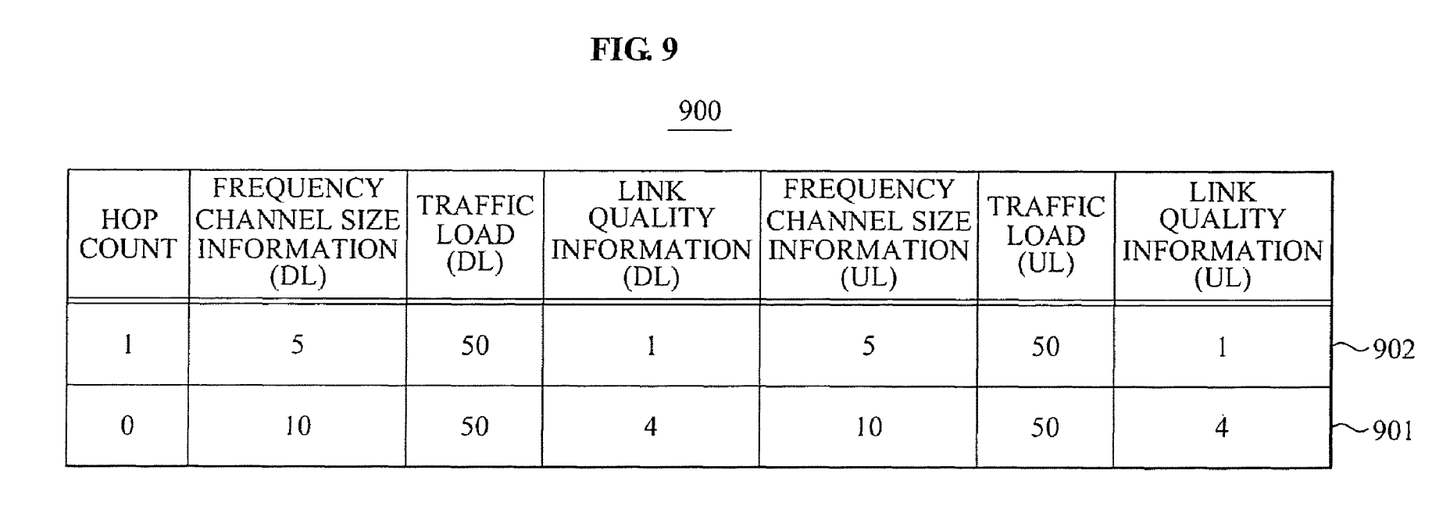
FIG. 9 is a diagram illustrating a table including information from a data frame that includes a frequency channel size information according to an embodiment of the present invention.

In the above example, all nodes of the mobile system are assumed to use a 10 MHz frequency channel. However, in an actual condition, a frequency channel size used in each node may be different. In this case, information about a frequency channel size used in each node may be needed to calculate an increasing resource usage rate. When a frequency channel size is different in each node, information about an adjacent node transmitted should be changed as shown in FIG. 9. A data frame according to an embodiment of the present invention can include a size information area storing frequency channel size information, and a base station or a relay station linked to the mobile system can be determined via each increasing resource usage rate of the base station and the relay station being calculated base on the link quality information, the traffic load information and the frequency channel size information.

As above, according to a process of establishing a path of the present invention, it is possible to balance efficiency and evenness of an entire mobile system by transmitting new control information to the mobile system and changing a parameter according to a system administrator's policy. A data frame according to aspects of the present invention can be used to transmit new control information to a mobile system.

FIG. 9 shows a table 900 including information from a data frame that includes frequency channel size information according to an embodiment of the present invention. The data frame 900 is an example of information that can be received in the new mobile system from the first relay station 402, as described in FIG. 4. The $3^{rd}$ row 901 of FIG. 9 shows a traffic load and link quality information for downlinks and uplinks of a base station 401, and the $2^{nd}$ row 902 of FIG. 9 shows a traffic load and link quality information for downlinks and uplinks of a relay station 402.

Figure 10:
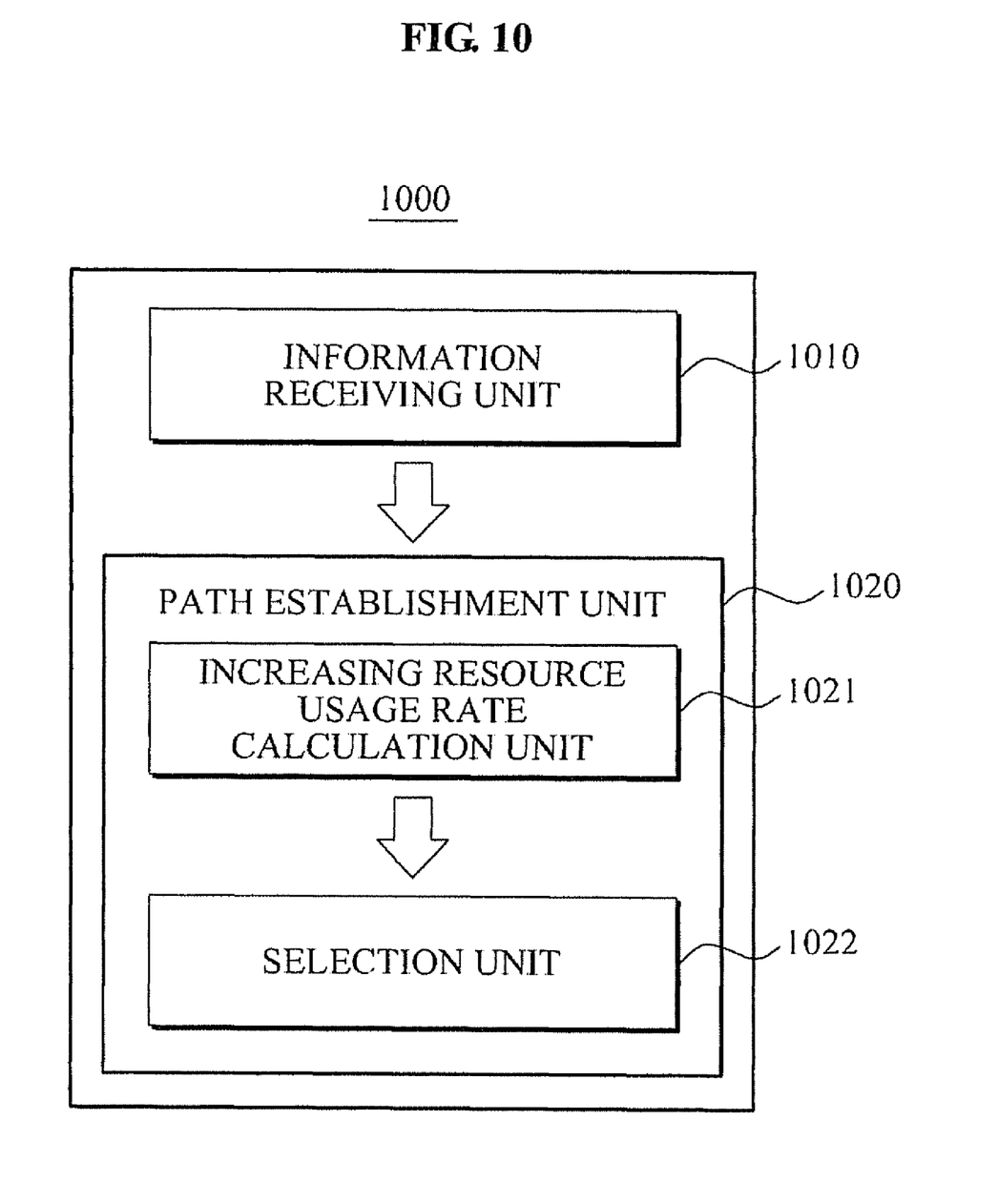
FIG. 10 is a block diagram illustrating an inner configuration of a mobile system according to an embodiment of the present invention.

FIG. 10 shows an inner configuration of a mobile system 1000 according to an embodiment of the present invention. The mobile system 1000 includes an information receiving unit 1010 and a path establishment unit 1020. According to other aspects of the present invention, the mobile system 1000 may include additional and/or different units. Similarly, the functionality of the information receiving unit 1010 and the path establishment unit may be integrated into a single component.

The information receiving unit 1010 receives information about at least one of link quality, traffic load, and frequency channel size, via a network. The link quality information can include information about a coding scheme of a link, and the traffic load information can include information about a data transmission amount per second to transmit from any one of the base station and the at least one relay station.

For example, a base station and relay stations transmit data to a frequency channel having a specific size. The frequency channel used in the base station and the relay stations can be identical or different. The frequency channel size is referred to herein as 'F'. The base station and the relay station determine the coding scheme according to a distance to destination node and a channel condition when transmitting the data. Each coding scheme has spectrum efficiency for a corresponding coding scheme, and the spectrum efficiency can be referred to as '$e_{scheme}$'.

A data transmission amount that the base stations or the relay stations can transmit during a predetermined time can be in proportion to multiplication of the frequency channel size 'F' and the spectrum efficiency '$e_{scheme}$'. For example, if the base station uses a frequency channel of 10 MHz and the spectrum efficiency '$e_{scheme}$' uses a coding scheme of 2 b/s/Hz, then the base station can transmit the data by a transmission speed of 20 Mbps when all overhead is disregarded. The data is transmitted by a transmission speed 10 Mbps when spectrum efficiency '$e_{scheme}$' of the coding scheme is 1 b/s/Hz. As described above, as a base station and a relay station use a coding scheme with a higher spectrum efficiency '$e_{scheme}$', it is possible to transmit more data during the same time. The spectrum efficiency and traffic load should be considered when the mobile system 1000 establishes a path to receive service from the base station.

The path establishment unit 1020 establishes a path to a base station based on the received at least one information. The path establishment unit 1020 can include an increasing resource usage rate calculation unit 1021 and a selection unit 1022 to establish a path to a base station based on the received information.

The increasing resource usage rate calculation unit 1021 calculates an increasing resource usage rate of each of the base station and at least one relay station based on the received at least one information. The increasing resource usage rate can include an estimated value of a resource usage rate which will be increased in any one of the base station and the at least one relay station when a mobile system 1000 is connected to any one of the base station and the at least one relay station. The increasing resource usage rate calculation unit 1021 can calculate a first rate for the link quality information of the traffic load information, and calculate a second rate for the frequency channel size information of the first rate.

The selection unit 1022 selects one of the base station and the at least one relay station to establish the path based on the increasing resource usage rate. The selection unit 1022 establishes the path by selecting the base station or the relay station via various methods based on the increasing resource usage rate. For example, the selection unit 1022 may select one of the base station and the at least one relay station so that a sum of increasing resource usage rates to each of the base station and the at least one relay station on the path is at a minimum, or may select one of the base station and the at least one relay station based on an existing resource usage rate and the increasing resource usage rate of the base station and the at least one relay station so that an increasing resource usage rate of a base station or a relay station having a highest existing resource usage rate is at a minimum. The selection unit 1022 may also select the base station and the at least one relay station so that a resource usage rate of the base station is at a minimum. Finally, the selection unit 1022 may give a weighted value to each increasing resource usage rate of each of the base station and the at least one relay station on the path according to a hop count, and then select one of the base station and the at least one relay station so that a sum of increasing resource usage rates with the weighted value is minimized.

Resource usage rates of the base station and the relay station can be changed depending on which paths the mobile system 1000 being added to, and the selection unit 1022 can establish the path based on the resource usage rate, that is the resource usage rate. A standard of selecting the path can be determined by a system administrator or a prescribed policy.

As described above, according to aspects of the present invention, it is possible to decrease a service admission rate and increase an acceptance rate and performance without additional resources by considering all paths to a base station as well as all paths to an access link.

The process of establishing a path according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mobile system, comprising:
   an information receiving unit to receive information about at least one of link quality, traffic load, and frequency channel size, via a network; and
   a path establishment unit to establish a path to a base station or at least one relay station, based on an increase of a resource usage of each of the base station or the at least one relay station using the received information,
   wherein the path establishment unit comprises:
   an increasing resource usage rate calculation unit to calculate increasing resource usage rates of each of the base station and the at least one relay station based on the received information; and
   a selection unit to select one of the base station and the at least one relay station to establish the path based on the increasing resource usage rates.

2. The system of claim 1, wherein the link quality information comprises information about a coding scheme of a link.

3. The system of claim 1, wherein the traffic load information comprises information about a data transmission amount per second to transmit from any one of the base station and the at least one relay station.

4. The system of claim 3, wherein the at least one relay station periodically transmits resource usage amounts of a downlink and an uplink of the at least one relay station.

5. The system of claim 1, wherein the increasing resource usage rates comprises an estimated value of a resource usage rate which will be increased in any one of the base station and the at least one relay station when the mobile system is connected to any one of the base station and the at least one relay station.

6. The system of claim 1, wherein the increasing resource usage rate calculation unit calculates, to be the increasing resource usage rates, a first rate for the link quality information of the traffic load information, and calculates a second rate for the frequency channel size information of the first rate.

7. The system of claim 1, wherein the selection unit selects one of the base station and the at least one relay station so that a sum of increasing resource usage rates to each of the base station and the at least one relay station on the path is at a minimum.

8. The system of claim 1, wherein the selection unit selects one of the base station and the at least one relay station based on existing resource usage rates and the increasing resource usage rates of the base station and the at least one relay station so that an increasing resource usage rate of a base station or a relay station having the highest existing resource usage rate is at a minimum.

9. The system of claim 1, wherein the selection unit selects one of the base station and the at least one relay station so that a resource usage rate of the base station is at a minimum.

10. The system of claim 1, wherein the selection unit gives a weighted value to each increasing resource usage rate of each of the base station and the at least one relay station on the path according to a hop count and selects one of the base station and the at least one relay station so that a sum of increasing resource usage rates with the weighted value is minimized.

11. The system of claim 1, wherein the at least one relay station periodically transmits resource usage amounts of a downlink and an uplink of the at least one relay station.

12. A non-transitory computer-readable storage medium recording a data frame comprising:
a link quality information storage region to store link quality information; and
a traffic load information storage region to store traffic load information,
wherein one of a base station and at least one relay station is determined so that a mobile system is connected based on an increase of a resource usage of each of the base station or the at least one relay station using the link quality information and the traffic load information, and
wherein the mobile system calculates increasing resource usage rates of each of the base station and the at least one relay station based on the received information and selects one of the base station and the at least one relay station to establish the path based on the increasing resource usage rates.

13. The storage medium of claim 12, further comprising:
a size information region to store a frequency channel size information, wherein the one of the base station and the at least one relay station is determined according to where the mobile system is connected based on the link quality information, the traffic load information, and the frequency channel size information.

14. The storage medium of claim 12, wherein the link quality information comprises information about a coding scheme of the link.

15. The storage medium of claim 12, wherein the traffic load information comprises information about a data transmission amount per second to transmit from one of the base station and the at least one relay station.

16. A method to establish a path, the method comprising:
receiving information about at least one of link quality, traffic load, and frequency channel size, via a network; and
establishing a path to a base station based on an increase of a resource usage of each of the base station or at least one relay station using the received information,
wherein the establishing path to the base station based on the received information comprises:
calculating increasing resource usage rates based on the received information; and
selecting one of the base station and the at least one relay station to establish the path based on the increasing resource usage rates.

17. The method of claim 16, wherein the link quality information comprises information about a link scheme of a link.

18. The method of claim 16, wherein the traffic load information comprises information about a data transmission amount per second to transmit from one of the base station and at least one relay station.

19. The method of claim 16, wherein the increasing resource usage rates comprises an estimated value of a resource usage rate which will be increased in one of the base station and the at least one relay station when the mobile system is connected to any one of the base station and the at least one relay station.

20. A non-transitory computer-readable storage medium storing a program to implement the method of claim 16.

21. The method of claim 16, wherein the establishing of the path to the base station comprises:
establishing the path to the base station based on the received information and a policy of an administrator of a system that includes the base station.

22. A method of establishing a path for a mobile system, the method comprising:
receiving information about at least one of quality, traffic load, and frequency channel size, via a network; and
establishing a path from the mobile system to an access link based on an increase of a resource usage of each of a base station or at least one relay station using the received information so as to decrease a service admission rate or increase an acceptance rate,
wherein the establishing a path from the mobile system to an access link comprises:
calculating increasing resource usage rates based on the received information; and
selecting one of the base station and the at least one relay station to establish the path based on the increasing resource usage rates.

23. The method of claim 22, wherein the access link comprises a base station.

* * * * *